United States Patent
Hwang

(10) Patent No.: US 7,603,274 B2
(45) Date of Patent: Oct. 13, 2009

(54) METHOD AND APPARATUS FOR DETERMINING THE POSSIBILITY OF PATTERN RECOGNITION OF TIME SERIES SIGNAL

(75) Inventor: Kwangil Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 519 days.

(21) Appl. No.: 11/263,826

(22) Filed: Nov. 2, 2005

(65) Prior Publication Data

US 2006/0143005 A1    Jun. 29, 2006

(30) Foreign Application Priority Data

Dec. 29, 2004    (KR) .................. 10-2004-0115069

(51) Int. Cl.
  G10L 17/00    (2006.01)
  G10L 15/00    (2006.01)
  G10L 15/04    (2006.01)
(52) U.S. Cl. .................. 704/247; 704/236; 704/252
(58) Field of Classification Search ............. 704/251, 704/252, 255, 256, 247, 236
See application file for complete search history.

(56) References Cited

U.S. PATENT DOCUMENTS

| | | | | |
|---|---|---|---|---|
| 5,502,774 A | * | 3/1996 | Bellegarda et al. | 382/159 |
| 5,627,859 A | * | 5/1997 | Parr | 375/229 |
| 5,675,706 A | * | 10/1997 | Lee et al. | 704/256 |
| 5,717,826 A | * | 2/1998 | Setlur et al. | 704/252 |
| 5,832,430 A | * | 11/1998 | Lleida et al. | 704/256 |
| 5,987,411 A | * | 11/1999 | Petroni et al. | 704/255 |
| 6,125,345 A | * | 9/2000 | Modi et al. | 704/240 |
| 6,542,866 B1 | * | 4/2003 | Jiang et al. | 704/255 |
| 6,823,304 B2 | * | 11/2004 | Ikeda | 704/231 |
| 2002/0107692 A1 | * | 8/2002 | Litovsky | 704/270 |
| 2004/0204930 A1 | * | 10/2004 | Chang et al. | 704/202 |
| 2005/0216260 A1 | * | 9/2005 | Ps et al. | 704/213 |
| 2006/0074664 A1 | * | 4/2006 | Lam et al. | 704/255 |

OTHER PUBLICATIONS

Saberi et al. "Cognitive restoration of reversed speech", Nature, p. 760, 1999.*
Koo et al. "Speech recognition and utterance verification based on a generalized condidence score", IEEE trans. on speech and audio processing, Nov. 2001.*

* cited by examiner

Primary Examiner—Richemond Dorvil
Assistant Examiner—Jialong He
(74) Attorney, Agent, or Firm—Staas & Halsey LLP

(57) ABSTRACT

A method and apparatus for determining the possibility of pattern recognition of time series signal independent of a pattern recognition ratio is provided. The method for determining the possibility of pattern recognition of time series signal includes extracting a time forward feature and a time reversed feature from an input signal having a time series pattern, generating time forward alignment and time reversed alignment by using the time forward feature and the time reversed feature, comparing the time forward alignment with the time reversed alignment to compute a likelihood of pattern recognition, and determining that the input signal can be recognized if the likelihood is larger than a predetermined threshold value. The possibility of the pattern recognition of the whole system can be determined, independent of the pattern recognition capability of each of the pattern recognition models, by extracting the patterns from the time series signal by using the plurality of the pattern recognition models and then obtaining the likelihood between the patterns to compare the likelihood with the threshold value. In addition, the pattern recognition can be performed in the non-limited environment.

18 Claims, 10 Drawing Sheets

METHOD AND APPARATUS FOR DETERMINING THE POSSIBILITY OF PATTERN RECOGNITION OF TIME SERIES SIGNAL

CROSS-REFERENCE TO RELATED APPLICATION

This application claims the benefit of Korean Patent Application No. 10-2004-0115069, filed on Dec. 29, 2004, in the Korean Intellectual Property Office, the disclosure of which is incorporated herein by reference.

BACKGROUND OF THE INVENTION

1. Field of the Invention

The present invention relates to signal recognition, and more particularly to a method and an apparatus for determining the possibility of pattern recognition of time series signal.

2. Description of Related Art

A time series signal is a signal of which the value is varied according to the elapse of the time. As examples of the time series signal, there are a speech signal, a handwritten character signal, and a gesture signal.

Recognition of the contents included in the time series signal is referred to as the pattern recognition of the time series signal. As a representative example of a pattern recognition of a time series signal, there is the speech recognition.

The speech recognition allows a machine to understand the usual speech of human to perform the operations according to the understood speech. The technique of the speech recognition allows information to be obtained at a long distance while the human does not directly move by the development of the computer and information communication, and thus the equipments composed of a system which is operated according to the speech has been continuously developed.

Various speech recognition application systems have been developed on the basis of the speech recognition technique, and, among them, there is a system for notifying desired information according to the language spoken by a user. For example, assuming that there is a telephone number guide system of any group, a system for displaying the telephone number of the corresponding department on the monitor if a user speaks the name of the department to be searched in his/her speech can be considered.

In a pattern recognizing system of the time series signal, including the speech recognizing system, it is most preferable that, while the user does not recognize the existence of the pattern recognizing system, the environment which is likely to exchange the contents included in the pattern with the person is made. However, it is very difficult to embodying such system. In the pattern recognizing system of the time series signal, a method of determining the possibility of the pattern recognition, allowing the machine to perform the pattern recognition with respect to the portion which the pattern can be recognized and allowing it to be connected to a person with respect to the portion which the pattern can not be recognized has been studied in the present technical level.

For example, in the telephone number guide system, in case that the user speaks with the speech which cannot be recognized by the speech recognizing system or the user requires the name of the department which does not exist in the database of the speech recognizing system, it is connected to the human operator to solve the problem.

However, in the conventional art, there is a problem that the capability for determining whether the pattern can be recognized by the pattern recognizing system of the time series signal depends on the pattern recognition ratio itself. In other words, the system having excellent pattern recognition also has the excellent capability for determining whether the pattern cannot be recognized, but the system having inferior pattern recognition also has the inferior capability for determining whether the pattern cannot be recognized.

The same problem is generated even in case that the pattern recognition ratio is varied according to the variation of the environment of the same system. That is, conventional system can be operated well in environment that the pattern can be recognized well so that the system needs not be connected to the human operator, but the system can not determine that the pattern can not be recognized in the environment that the pattern cannot be recognized-well so that the system need be connected to the human operator. Accordingly, the system continuously tries to recognize the pattern instead of connecting it to the human operator, thereby giving the inconvenience to the user.

BRIEF SUMMARY

An aspect of the present invention provides a method and an apparatus for determining the possibility of the pattern recognition independent of the pattern recognition ratio itself in the recognition of a signal having the time series pattern.

An aspect of the present invention also provides a computer-readable recording medium having embodied thereon a computer program for the method for determining the possibility of the pattern recognition of the signal having the time series pattern on a computer.

According to an aspect of the present invention, there is provided a method for determining the possibility of pattern recognition of time series signal comprising extracting a time forward feature and a time reversed feature from an input signal having a time series pattern; generating time forward alignment and time reversed alignment by using the time forward feature and the time reversed feature; comparing the time forward alignment with the time reversed alignment to compute a likelihood of pattern recognition; and determining that the input signal can be recognized if the likelihood is larger than a predetermined threshold value.

According to another aspect of the present invention, there is provided an apparatus for determining the possibility of pattern recognition of time series signal, comprising a feature extracting unit extracting a time forward feature and a time reversed feature from an input signal having a time series pattern; an alignment generating unit generating time forward alignment and time reversed alignment by using the time forward feature and the time reversed feature; likelihood computing unit comparing the time forward alignment with the time reversed alignment to compute a likelihood of pattern recognition; and recognition possibility determining unit determining that the input signal can be recognized if the likelihood is larger than a predetermined threshold value.

According to another aspect of the present invention, there is provided a computer-readable storage medium encoded with processing instructions for causing a processor to execute the above-described method.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
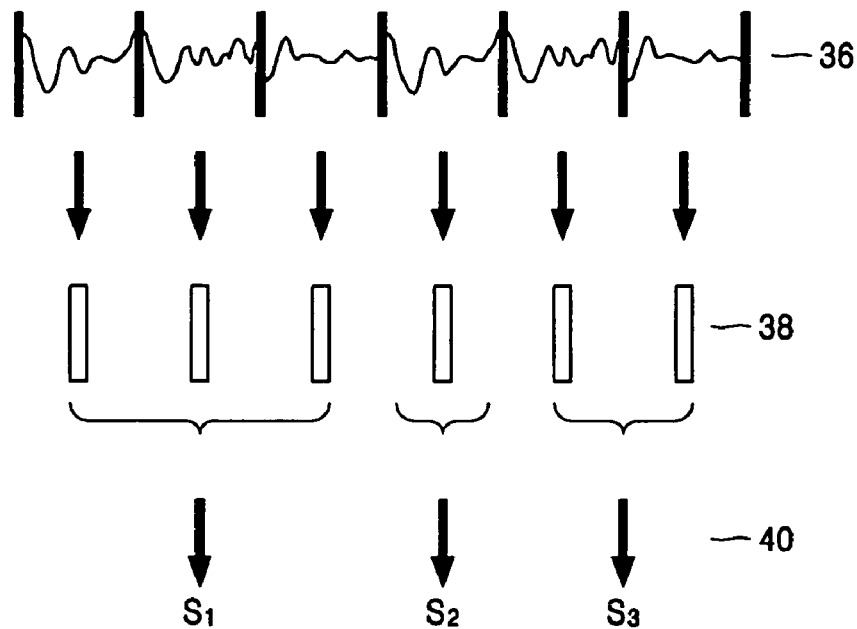
FIG. 1 shows concept representing a pattern recognizing process of a time series signal.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 shows concept representing a pattern recognizing process of a time series signal.

The time series signal 36 is varied according to the elapse of the time. As the example of the time series signal, there is a speech signal, a handwritten character signal or a gesture signal. In case of the handwritten character signal or the gesture signal, the time series signal can have a coordinate value on a two-dimension or three-dimension space. Even in this case, the time series signal 36 shown in FIG. 1 can be obtained by suitable coordinate conversion.

In order to recognize the pattern of the time series signal 36, only the information which is available for the pattern recognition must be extracted from the time series signal. This is referred to as feature extraction. Referring to FIG. 1, the time series signal 36 is divided into frames and then the feature 38 is extracted from each frame.

After extracting the feature 38, the features 38 are matched to the states 40 on the basis of the contents included in the feature by each frame.

Figure 2:
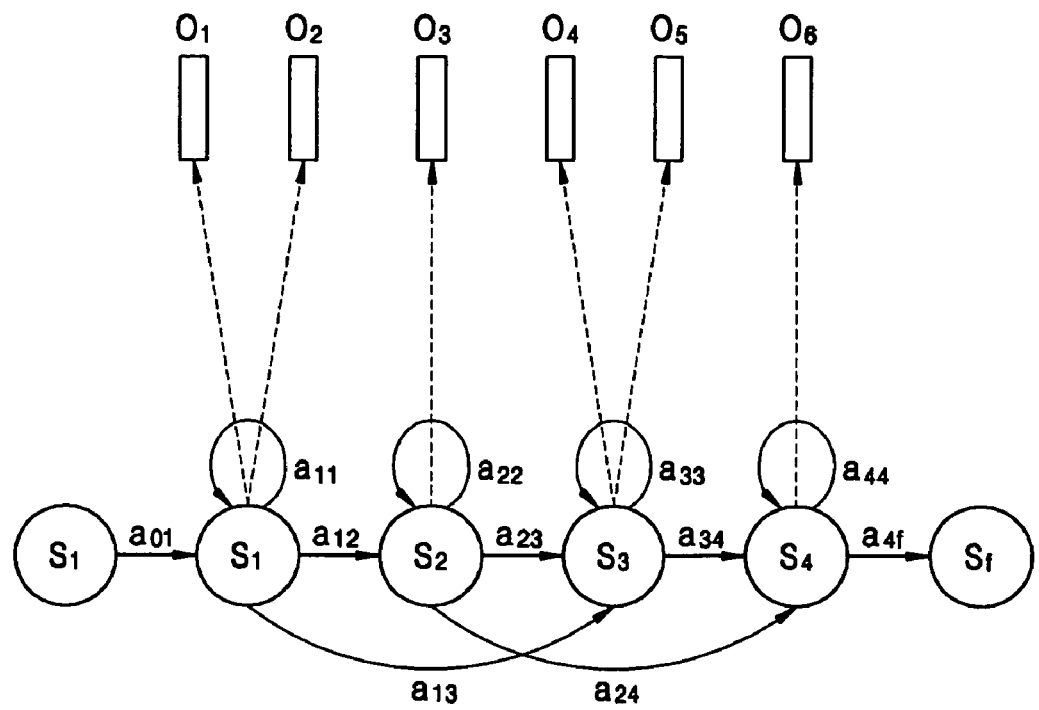
FIG. 2 shows the process for matching the states to the features by each frame.

FIG. 2 shows the process for matching the states to the features by each frame. Referring to FIG. 2, the observed features are matched to each of the state ($s_1$, $s_2$, $s_3$) on hidden Markov Model (HMM), respectively. In the example of FIG. 2, the features $o_1$ and $o_2$ are matched to the state $s_1$, the feature $o_3$ is matched to the state $s_2$, the features $o_4$ and $o_5$ are matched to the state $s_3$, and the feature $o_6$ is matched to the state $s_4$.

As such, the arrangement of the features matched to the states on the hidden Markov Model is referred to as alignment. Also, the feature of each frame is matched to the pattern, because each state is matched to the pattern to be recognized. As the example of the pattern, there is a phoneme or a word in the speech recognition or a character in the handwritten character recognition. That is, each feature is matched to a specific phoneme or word or a specific character.

Figure 3:
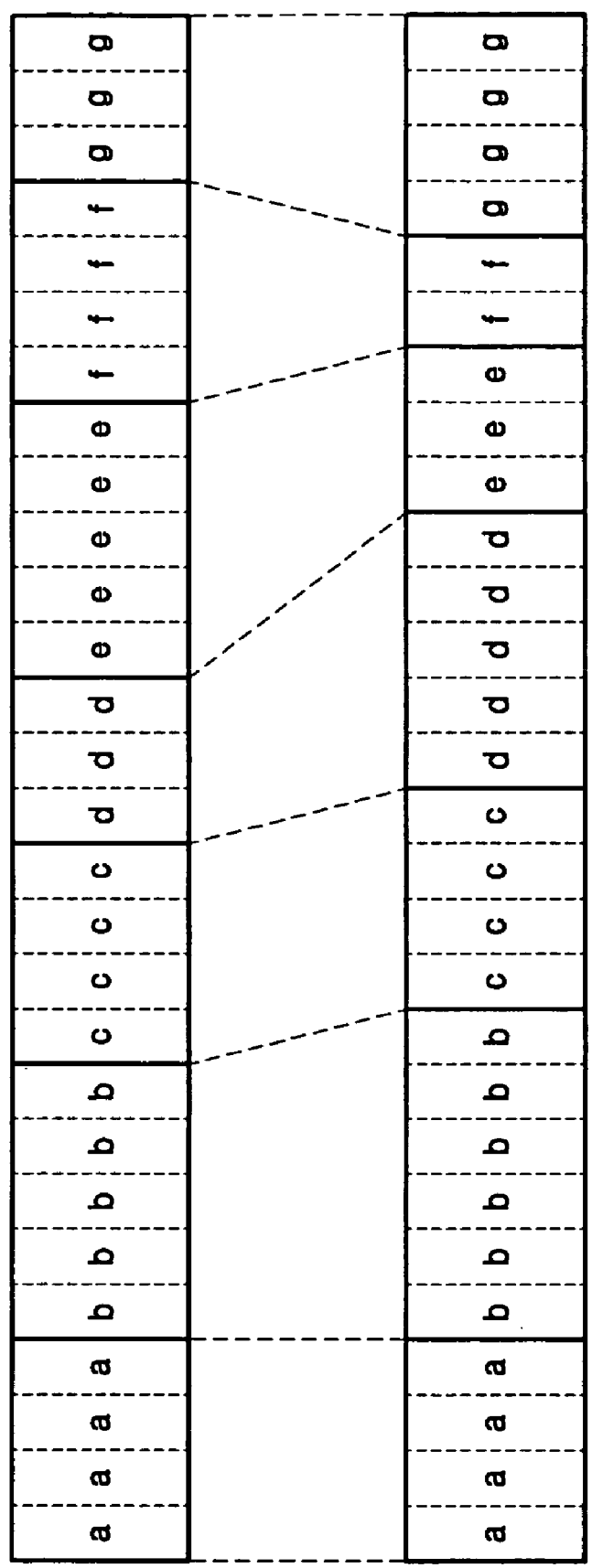
FIG. 3 shows the alignment of features matched to the patterns.

FIG. 3 shows the alignment of features matched to the patterns. In the alignment of the upper part of FIG. 3, four frames are matched to the state (or the pattern) a, and the next 5 features are matched to the state (or the pattern) b. On the other hand, in the alignment of the lower part of FIG. 3, four frames are matched to the state (or the pattern) a, and the next 6 features are matched to the state (or the pattern) b.

Figure 4:
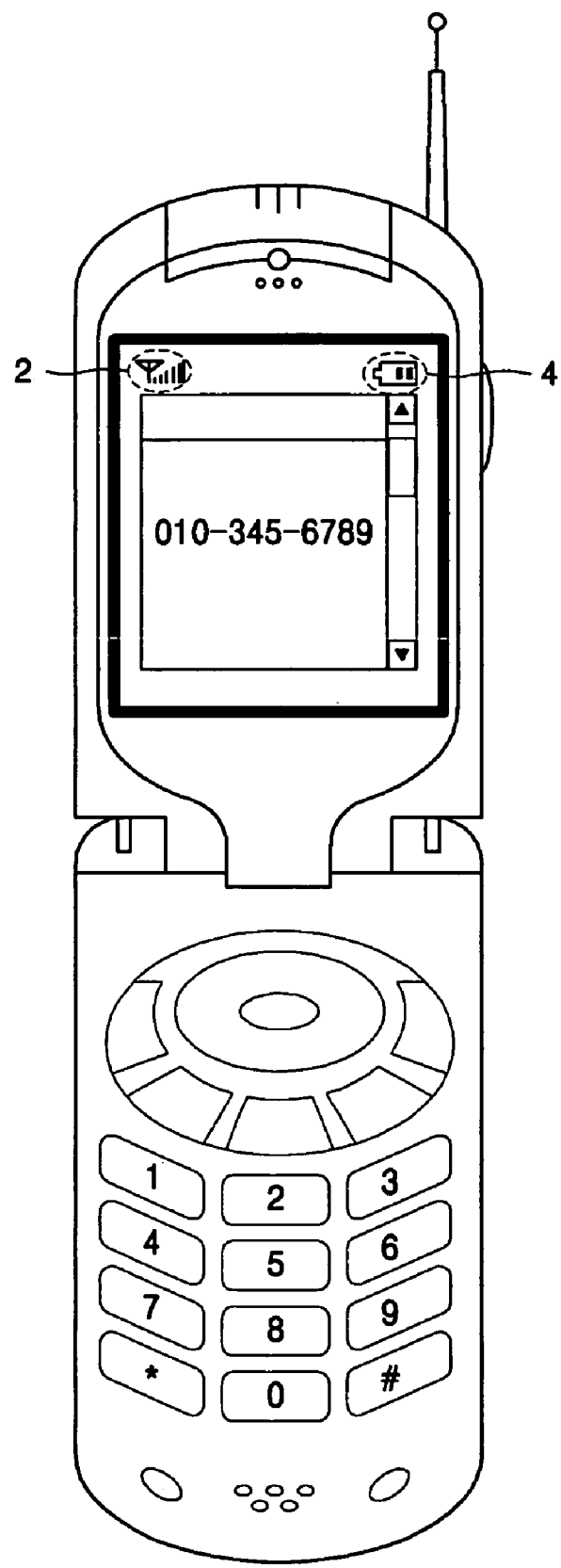
FIG. 4 shows a user interface of a portable phone.

FIG. 4 shows a user interface of a portable phone. Referring to FIG. 4, the problem of the general pattern recognizing system of the time series signal will be described by comparing the user interface of the portable phone with the user interface in the pattern recognition of the time series signal.

As shown in FIG. 4, an indication 2 representing the intensity of the radio wave and an indication 4 representing the charging state of the charger are displayed on the display screen of the general portable phone. The indication 2 representing the intensity of the radio wave is one of the indications representing the exterior environments of the portable phone, and the indication 4 representing the charging state of the charger is one of the indications representing the interior environments of the portable phone.

If the intensity of the radio wave weakens, the indication 2 representing the intensity of the radio wave is displayed in the state that the number of the antennas is reduced, thereby notifying the user that the radio wave is weakened. If the intensity of the radio wave weakens to the value less than a specific value, the user is aware of the inability of call and then moves into the place which the intensity of the radio wave is stronger or delays the call later. Accordingly, the user does not try the call, without being aware of the state that the intensity of the radio wave is weaken.

In addition, the indication 4 representing the charging state of the charger is displayed so that the number of the black spots is changed in proportion to the amount of the charged electricity, as the charging state of the charger is varied. If the amount of the charged electricity weakens to the value less than a specific value, the user is aware of the lack of the electricity and then charges the portable phone or delays a long call which allows the charger to be discharged later. Accordingly, the user does not try the call, without being aware of the state that the charger is mostly discharged.

By providing the user interface with the indications representing the exterior and interior environments of the portable phone, the satisfaction of the user can be increased. For example, if these indications are not provided, the user tries the call, without being aware of the state that the intensity of the radio wave is weaken or the charger is mostly discharged, and thus experiences several call fails. In this case, the user is unsatisfied with inconvenience in the use of the portable phone.

However, in the pattern recognizing system of the time series signal, such as the speech recognizing system, these indications provided by the user interface of the portable phone are not provided. That is, the general pattern recognizing system of the time series signal does not provide the indication for notifying the user whether it performs the pattern recognition well or not.

Accordingly, the researches on the method for determining whether the pattern recognizing system of the time series signal performs the pattern recognition well have been progressed. As a representative of these researches, there is a method for allowing the pattern recognizing system of the time series signal to determine the possibility of the pattern recognition, allowing it to directly perform the pattern recognition with respect to the portion of which the pattern can be recognized and notifying the user of the impossibility of the pattern recognition with respect to the portion of which the pattern can be not recognized. In other words, this is the research on the system which can represent the possibility or the impossibility of the pattern recognition.

However, in the pattern recognizing system using this method, there is a problem in that the operation for determining whether the pattern recognizing system can perform the pattern recognition uses the pattern recognizing process of the system. Thereby, in case that the pattern recognition is performed well, the capability of recognizing that the pattern recognition is performed well is excellent, but, in case that the pattern recognition is not performed well, the capability of recognizing that the pattern recognition is not performed well is inferior.

An embodiment of the present invention employs a method for recognizing the pattern of the time series signal by using a plurality of pattern recognition models, in order to solve the problem and provide the method for determining the possibility of the pattern recognition independent of the pattern recognizing process itself.

A basic approach of the pattern recognizing system according to an embodiment of the present invention is to perform the pattern recognition by using a plurality of the pattern recognition models which are different from each other for the input time series signal and then determine whether the pattern recognition is performed well by comparing the results. According to this method, the possibility of the pattern recognition of the system can be determined independent of the pattern recognition ratio of each of the pattern recognition models.

The approach of an embodiment of the present invention can be explained by the metaphor of the distorted mirror window. In this metaphor, a wall attached with several mirror windows and a building mirrored in the wall can be considered. In this metaphor, the whole mirror window corresponds to the whole pattern recognizing system and each of the mirror windows corresponds to each of the pattern recognizing models composing the pattern recognizing system.

In this metaphor, it is noted that the number of the building is one, but the number of the mirrored figures is varied according to the property of the mirror window. This corresponds to the fact that the result of recognizing the pattern of the same time series signal may be varied according to the pattern recognition model.

However, when comparing the figure mirrored in each mirror window with the figures mirrored at the adjacent mirror windows, a relative likelihood is found. That is, how well the figure of the building is reflected is changed according to the given environment, but the degree that the whole mirror windows reflect the figure of the building become similar in the same environment.

Accordingly, the case that the figure mirrored in any mirror window is entirely not related to the figures mirrored in the adjacent mirror windows is not generated. Similar to the case of the actual mirror window, in the pattern recognizing system, the case that the result obtained by applying a specific pattern recognition model is entirely different from the result obtained by applying the other pattern recognition model is not generated.

In the pattern recognizing system according to an embodiment of the present invention, a method of extracting the patterns from the time series signal by using a plurality of the pattern recognition models to compare the patterns is used. At this time, the pattern is employed only when the likelihood computed by comparing the patterns is larger than a threshold value. In the conventional pattern recognizing system of the time series signal, the confidence for the pattern extracted by one pattern recognition model is computed and, in case that the confidence is larger than a threshold value, the pattern is considered as the well-recognized pattern and is used as it is. However, in the pattern recognizing system according to the present invention, in addition to these processes, a method which does not employ the extracted pattern in case that the patterns extracted by using the pattern recognition models do not have the likelihood is used. Thereby, whether the pattern recognition is performed well can be determined, independent of the pattern recognition ratio itself.

Figure 5:
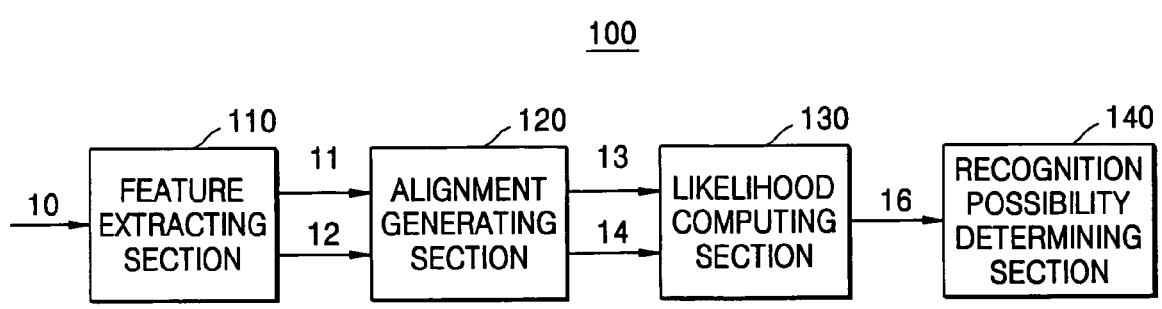
FIG. 5 is a block diagram of an apparatus for determining the possibility of the pattern recognition of the time series signal according to an embodiment of the present invention.

FIG. 5 is a block diagram of an apparatus for determining the possibility of the pattern recognition of the time series signal according to the present invention. Referring to FIG. 5, an embodiment of the apparatus for determining the possibility of the pattern recognition of the time series signal according to the present invention includes a feature extracting section 110, an alignment generating section 120, a likelihood computing section 130 and a recognition possibility determining section 140.

Figure 6:
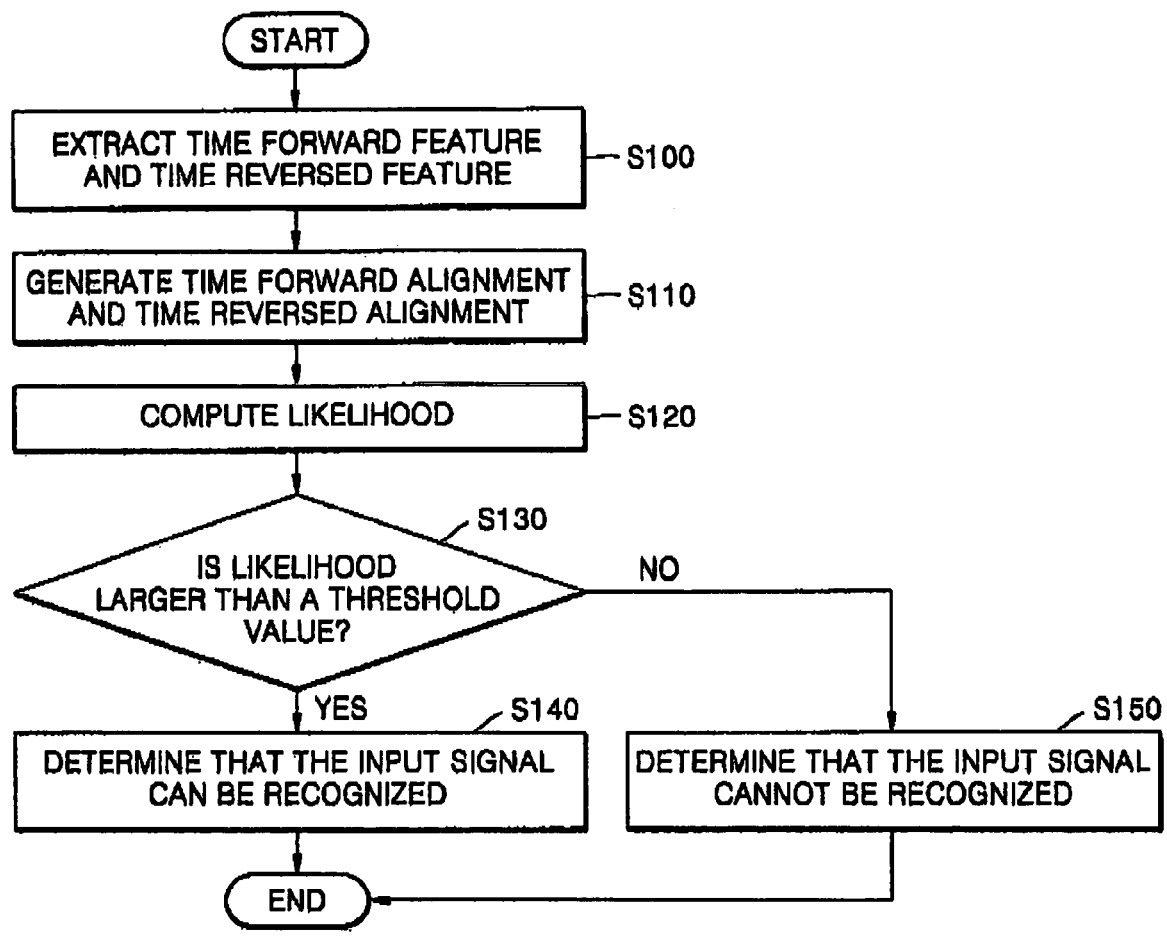
FIG. 6 is a flowchart representing the operations of the method of determining the possibility of the pattern recognition of the time series signal performed in the apparatus for determining the possibility of the pattern recognition of the time series signal shown in FIG. 5.

FIG. 6 is a flowchart representing the operations of a method for determining the possibility of the pattern recognition of the time series signal performed in the apparatus for determining the possibility of the pattern recognition of the time series signal shown in FIG. 5.

The feature extracting section 110 extracts a time forward feature 11 and time reversed feature 12 from an input signal 10 having the time series pattern (S100).

The time forward feature 11 means the feature extracted by applying the feature extracting process shown in FIG. 1 to the input signal 10. The time reversed feature 12 means the feature extracted by applying the feature extracting process to the time reversed signal of the input signal 10. The time reversed signal means the signal obtained by applying the time reversing process to the input signal 10. The time reversing process will be explained while explaining the signal reversing section of FIG. 9.

The alignment generating section 120 generates time forward alignment 13 and time reversed alignment 14 by using the time forward feature 11 and the time reversed feature 12 (S110). The time forward alignment 13 is to match each state on the hidden Markov Model (HMM) to the time forward feature 11 by each frame. The time reversed alignment 14 is to match each state on the hidden Markov Model (HMM) to the time reversed feature 12 by each frame.

The alignment generating section 120 includes a forward alignment generating section (not shown) and a reversed alignment generating section (not shown).

The forward alignment generating section matches the time forward feature to each state on the time forward hidden Markov Model (HMM) by each frame.

The reversed alignment generating section matches the time reversed feature to each state on the time reversed hidden Markov Model (HMM) by each frame.

The likelihood computing section 130 compares the time forward alignment 13 with the time reversed alignment 14 to compute a likelihood 16 (S120).

The recognition possibility determining section 140 determines whether the likelihood is larger than a threshold value (S130), determines that the input signal 10 can be recognized if the likelihood 16 is larger than the threshold value (S140) and determines that the input signal 10 cannot be recognized if the likelihood 16 is not larger than the threshold value (S150).

Figure 7:
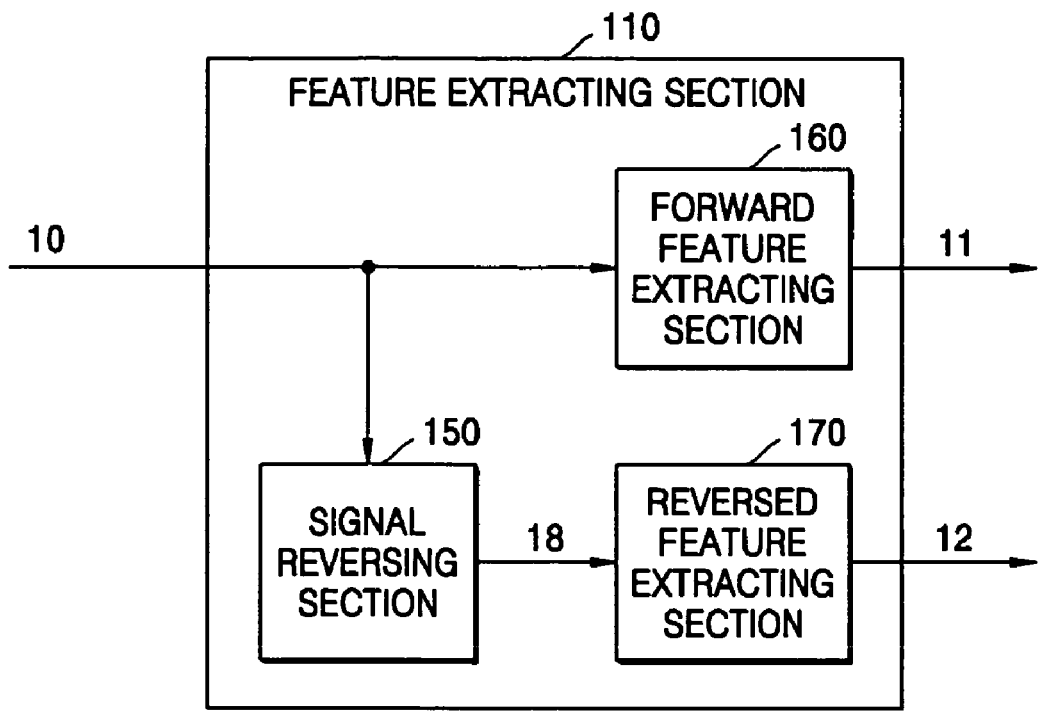
FIG. 7 is a block diagram representing an example of the structure of the feature extracting section shown in FIG. 5.

FIG. 7 is a block diagram representing an example of the structure of the feature extracting section 110 shown in FIG. 5. Referring to FIG. 7, the feature extracting section 110 includes a signal reversing section 150, a forward feature extracting section 160 and a reversed feature extracting section 170.

Figure 8:
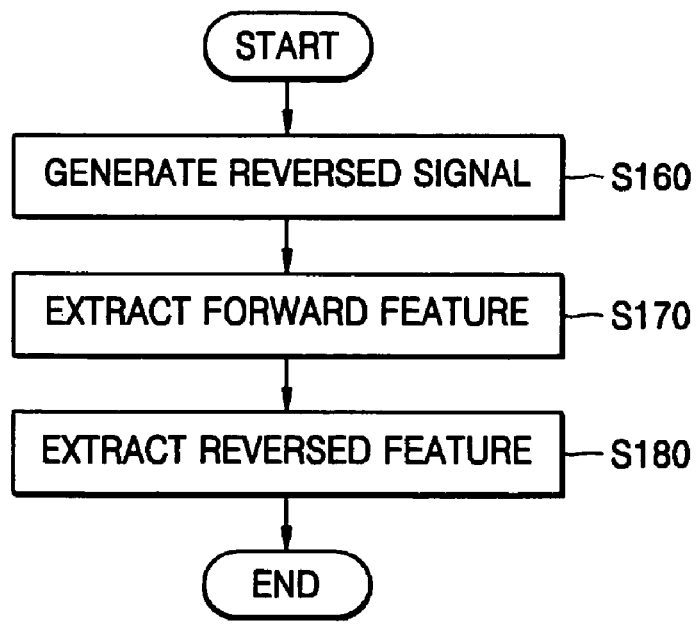
FIG. 8 is a flowchart representing the operations of an example of the feature extracting method performed in the feature extracting section shown in FIG. 7.

FIG. 8 is a flowchart representing the operations feature extracting section 110 shown in FIG. 7. The feature extracting method shown in FIG. 8 is an example of the operation S100 of FIG. 6.

The signal reversing section 150 time-reverses the input signal 10 to generate the time reversed signal 18 (S160).

The forward feature extracting section 160 extracts the time forward feature 11 from the input signal 10 (S170).

The reversed feature extracting section 170 extracts the time reversed feature 12 from the time reversed signal 18 (S180).

Figure 9:
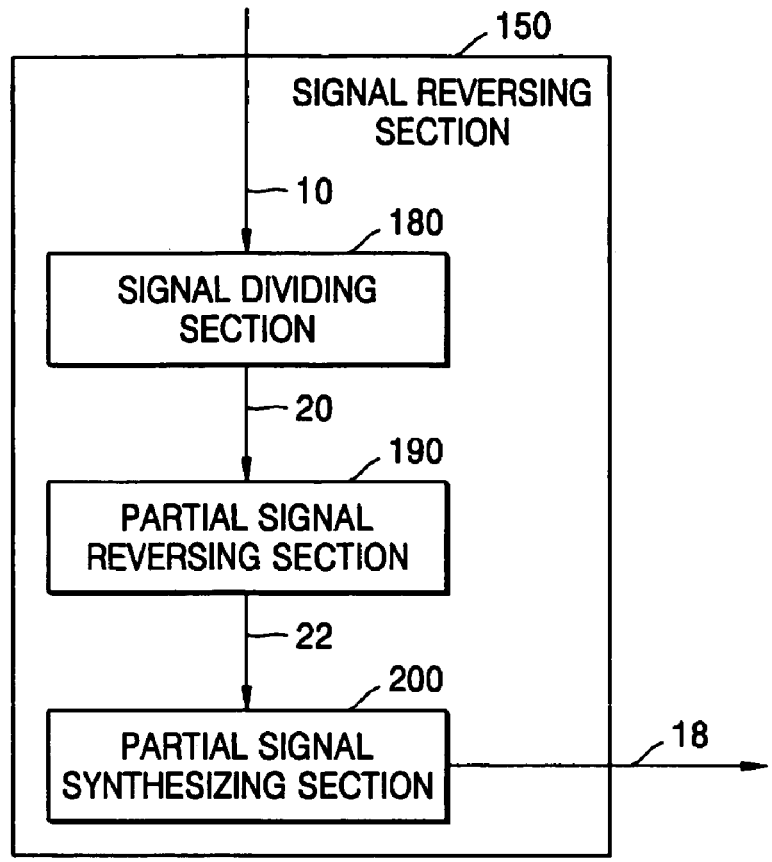
FIG. 9 is a block diagram representing an example of the structure of the signal reversing section shown in FIG. 7.

FIG. 9 is a block diagram representing an example of the structure of the signal reversing section 150 shown in FIG. 7. Referring to FIG. 9, the signal reversing section 150 a signal dividing section 180, a partial signal reversing section 190 and a partial signal synthesizing section 200.

Figure 10:
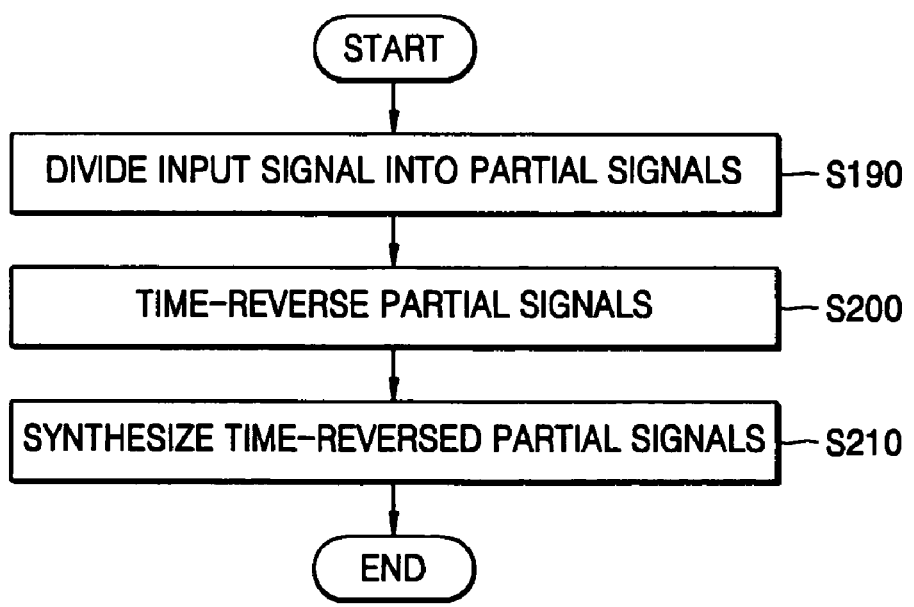
FIG. 10 is a flowchart representing the operations of an example of the signal reversing method performed in the signal reversing section shown in FIG. 9.

FIG. 10 is a flowchart representing the operations of the signal reversing section 150 shown in FIG. 9. The signal reversing method shown in FIG. 10 is an example of the operation S160 of FIG. 8.

The signal dividing section 180 divides the input signal 10 into partial signals 20 of the reversed region length unit (S190).

The partial signal reversing section 190 time-reverses the partial signals 20, respectively (S200).

The partial signal synthesizing section 200 synthesizes the time-reversed partial signals 22 to generate the time reversed signal 18 (S210).

Figure 11:
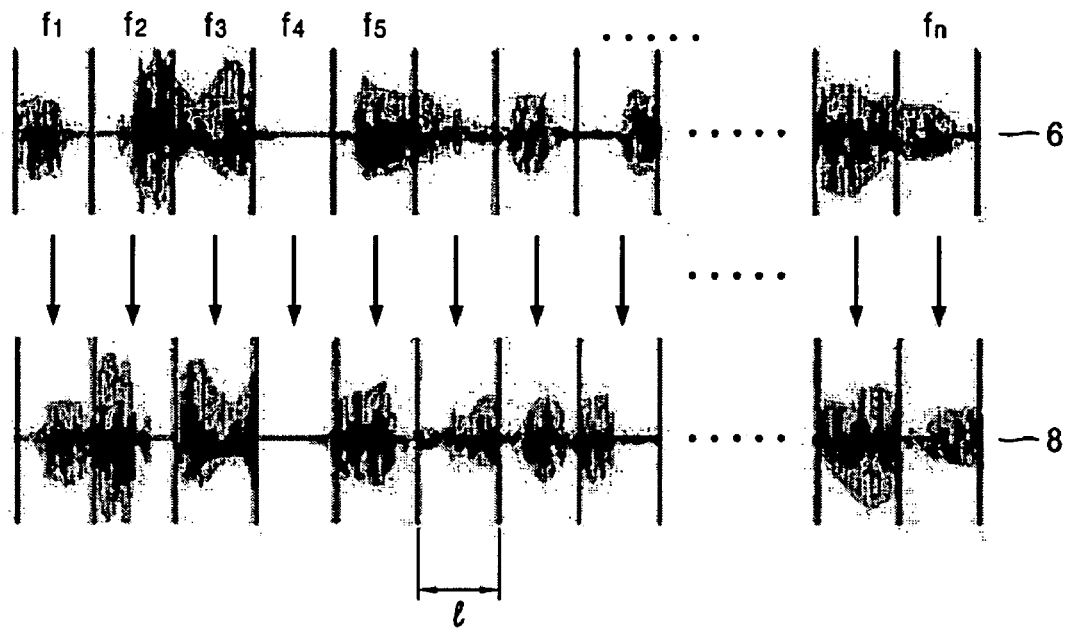
FIG. 11 is an example of the time reversing process executed by the signal reversing section shown in FIG. 9.

FIG. 11 is an example of the time reversing process performed by the signal reversing section 150 shown in FIG. 9.

The time forward signal 6 which is the input signal is divided into partial signals f1, f2, f3, etc. by the signal dividing section 180. At this time, the partial signals f1, f2, f3, etc. have the reverse region length (1 of FIG. 18) unit. The divided partial signals f1, f2, f3, etc. are time-reversed by the partial signal reversing section 190, respectively. The time-reversed partial signals 22 are synthesized in the partial signal synthesizing section 200 to compose the time reversed signal 8.

The reversed region length may be the whole length of the input signal or the length of the frame.

In psychoacoustics, the researches on the speech signal according to the time reversing method have been developed, and one among them is as follows:

The subjects were allowed to hear the speech signals having different reversed region lengths to examine which word is recognized and then whether the speech signal is recognized to be identical with the original word was determined. The experiment that the plurality of the subjects are allowed to hear a plurality of the words while changing the reversed region length was performed.

Figure 12:
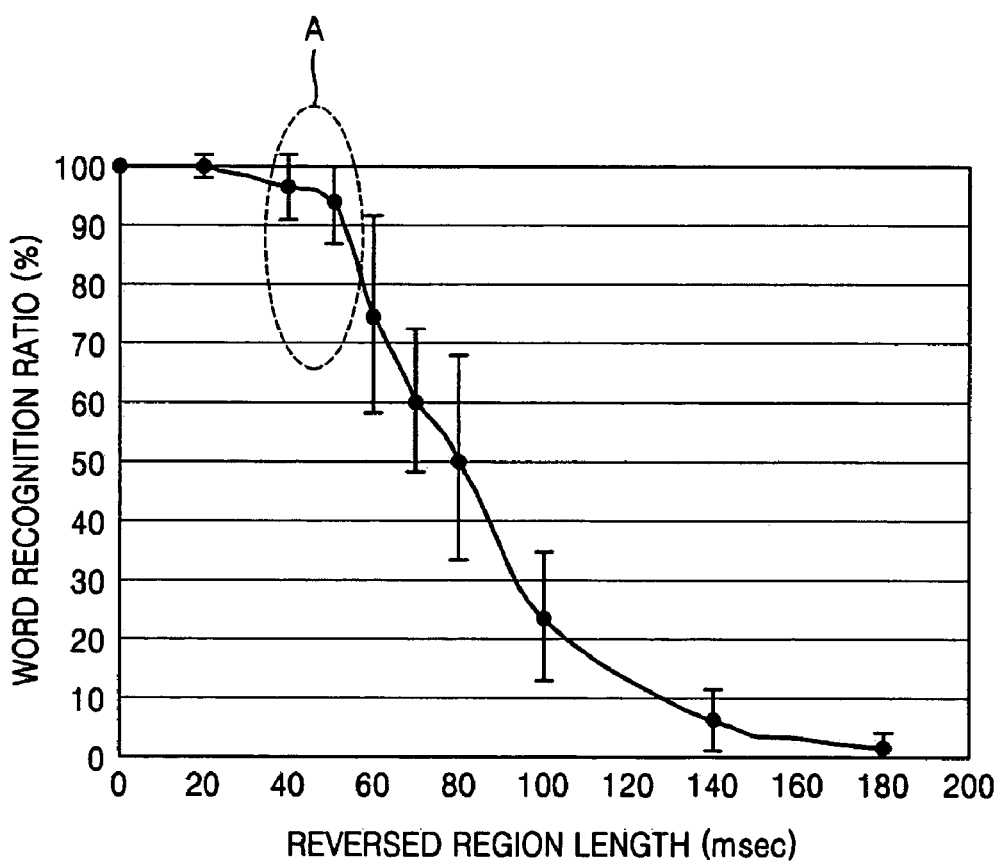
FIG. 12 is a graph representing word recognizing ratios of subjects vs. various reversed region lengths.

FIG. 12 is a graph representing word recognizing ratios of subjects vs. various reversed region lengths. Referring to FIG. 12, the word recognizing ratio holds the normal state in the region having the reversed region length of 20 msec to 60 msec, but the word recognizing ratio is rapidly reduced in the region having the larger reversed region length.

In an embodiment of the present invention, the reversed region length can become the region A of FIG. 12, that is, 40 msec to 60 msec. This is because the time reversing is easily performed in real time and the property of the time reversed signal appears well if the time reversed signal of this region is used.

Figure 13:
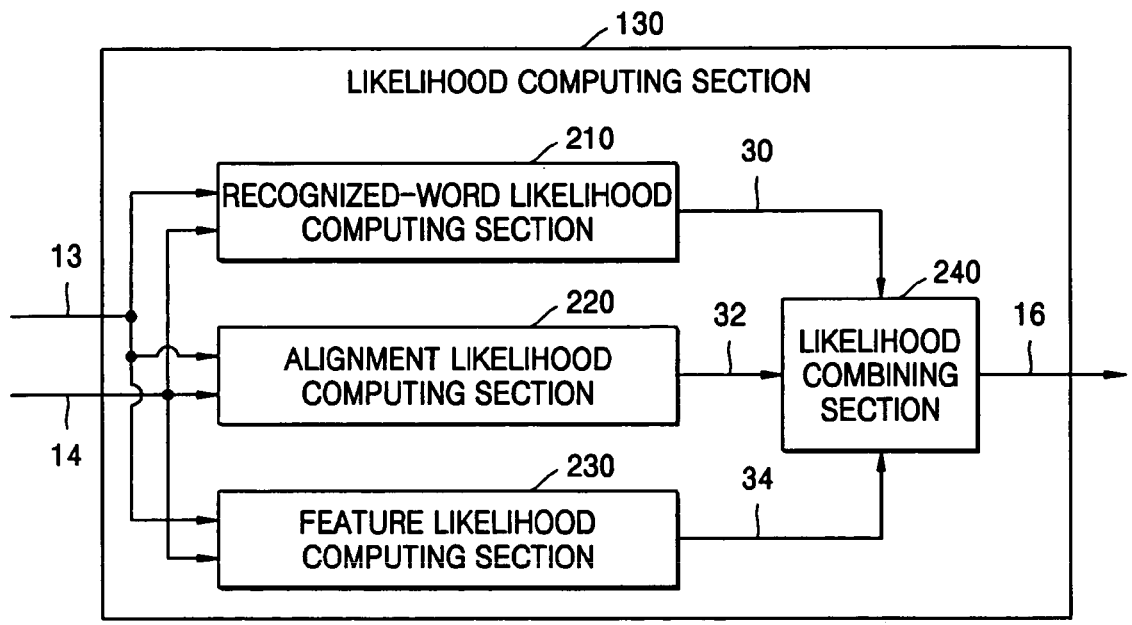
FIG. 13 is a block diagram representing an example of the structure of the likelihood computing section shown in FIG. 5.

FIG. 13 is a block diagram representing an example of the structure of the likelihood computing section 130 shown in FIG. 5. Referring to FIG. 13, the likelihood computing section 130 includes a recognized-word likelihood computing section 210, an alignment likelihood computing section 220, a feature likelihood computing section 230 and a likelihood combining section 240.

Figure 14:
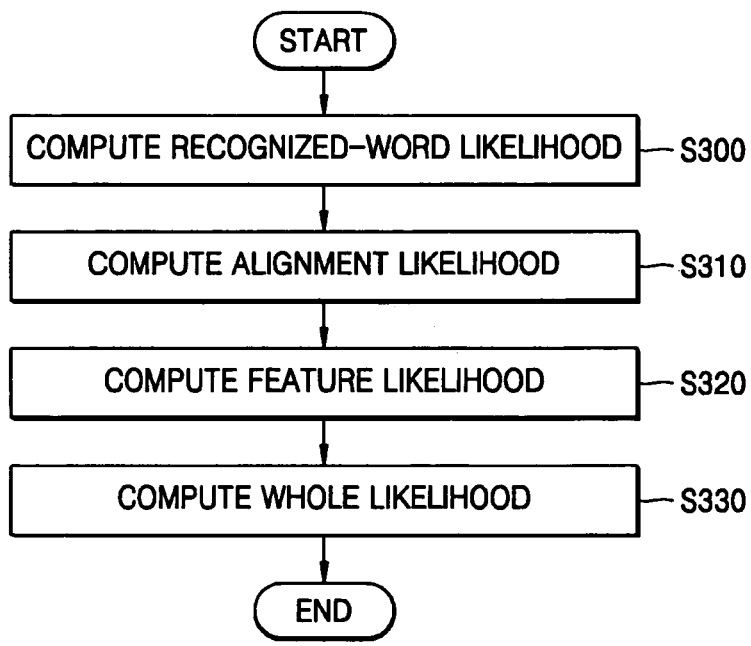
FIG. 14 is a flowchart representing an example of a likelihood computing method performed in the likelihood computing section shown in FIG. 13.

FIG. 14 is a flowchart representing a likelihood computing method performed in the likelihood computing section 130 shown in FIG. 13. The likelihood computing method shown in FIG. 14 is an example of the operation S120 of FIG. 6.

The recognized-word likelihood computing section 210 computes the recognized-word likelihood 30 which is the likelihood between the recognized word corresponding to the time forward alignment and the recognized word corresponding to the time reversed alignment (S300).

The alignment likelihood computing section 220 computes an alignment likelihood 32 which is the likelihood between the time forward alignment and the time reversed alignment (S310).

The feature likelihood computing section 230 computes a feature likelihood 34 which is the likelihood between the features corresponding to the time forward alignment and the features corresponding to the time reversed alignment (S320).

The likelihood combining section 240 combines the recognized-word likelihood, the alignment likelihood and the feature likelihood to compute the whole likelihood 16 between the forward alignment and the reversed alignment (S330). The whole likelihood 16 is obtained by multiplying the recognized-word likelihood, the alignment likelihood, and the feature likelihood by a predetermined weight, respectively, and adding them to obtain a weighted sum, and dividing the weighted sum by the total number of frames of the input signal for normalizing whole likelihood value over various length of possible input signals.

Figure 15:
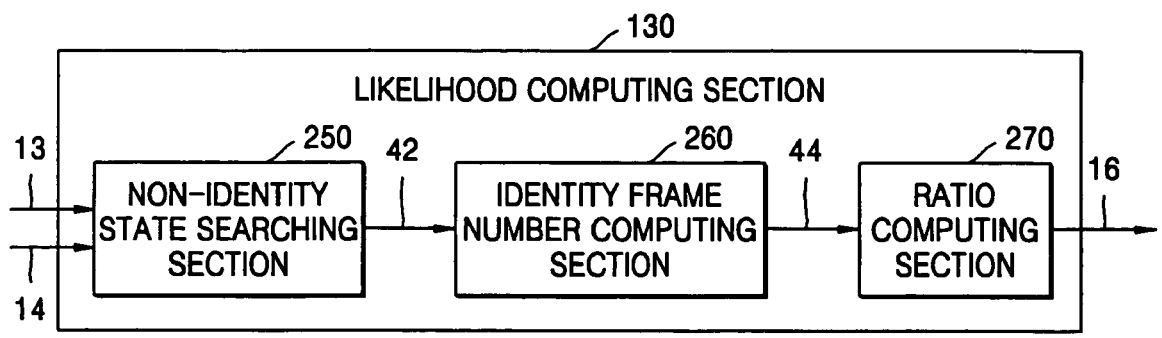
FIG. 15 is a block diagram representing an example of the structure of the likelihood computing section shown in FIG. 5.
Figure 16:
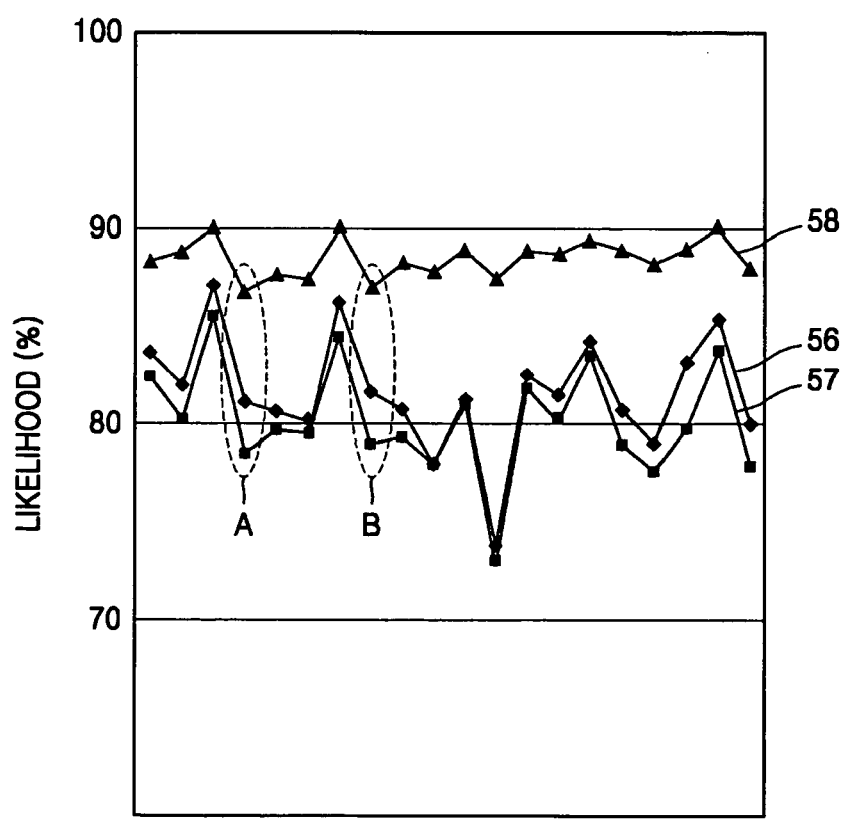

FIG. 15 is a block diagram representing an example of the structure of the likelihood computing section 130 shown in FIG. 5. Referring to FIG. 15, the likelihood computing section 130 includes a non-identity state searching section 250, an identity frame number computing section 260 and a ratio computing section 270.

The non-identity state searching section 250 compares the state of the frame on the time forward alignment with the state of the frame on the time reversed alignment to search the inserted, deleted or replaced states.

The identity frame number computing section 260 obtains the number of the frames by subtracting the number of the frames corresponding to the inserted, deleted, or replaced states from the number of the whole frames, that is, the number of the frames which the state of the frame on the time forward alignment is identity to that of the frame on the time reversed alignment.

The ratio computing section 270 divides the number of the identity frames by the number of the whole frames to set the ratio thereof as the likelihood.

The likelihood computed in the likelihood computing section 130 according to an embodiment of the present invention has a shape similar to a user satisfaction post-examined in the general pattern recognizing system which uses the time forward signal as the input signal and a user satisfaction 5 post-examined in the general pattern recognizing system which uses the time reversed signal as the input signal.

In case that the confidence according to one pattern recognizing system has a high value, but the confidence according to the other speech recognizing system has a low value, the non-identity between the alignments becomes increased. Accordingly, the apparatus for determining the possibility of pattern recognition according to the present invention obtains likelihood having a low value. By this method, the system notifies the user that the pattern cannot be recognized or the user is connected to the human operator, without delivering the wrongly recognized result to the user.

Accordingly, since the method and apparatus for recognizing the pattern of the time series signal employs the method and the apparatus for determining the possibility of the pattern recognition of the time series signal according to the present invention, the pattern recognition can be embodied in the non-limited environment. In other words, the pattern recognition can be performed in the environment which the pattern recognition can be performed and the adaptive pattern recognition can be performed by notifying the user of the impossibility of the pattern recognition or requiring the help of the human in the environment which the pattern recognition cannot be performed.

Embodiments of the present invention can also be embodied as computer (including an apparatus having an information processing function) readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the method and apparatus for determining the possibility of the pattern recognition of the time series signal according to the above-described embodiments of the present invention, the possibility of the pattern recognition of the whole system can be determined, independent of the pattern recognition capability of each of the pattern recognition models, by extracting the patterns from the time series signal by using the plurality of the pattern recognition models and then obtaining the likelihood between the patterns to compare the likelihood with the threshold value. In addition, by applying the method and apparatus for determining the possibility of the pattern recognition to the method and apparatus for recognizing the pattern of the time series signal, the pattern recognition can be performed in the non-limited environment.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of determining a possibility of pattern recognition of a time series signal, comprising:
   extracting a time forward feature and a time reversed feature from an input signal having a time series pattern;
   generating time forward alignment and time reversed alignment by using said time forward feature and said time reversed feature;
   comparing said time forward alignment with said time reversed alignment to compute a likelihood of pattern recognition; and
   using a processor for determining that said input signal can be recognized when said likelihood is larger than a predetermined threshold value,
   wherein the method of determining the possibility of pattern recognition is performed independent of a pattern recognition ratio of each of pattern recognition models for recognizing patterns of the time series signal.

2. The method according to claim 1, wherein said extracting comprises:
   time-reversing said input signal to generate a time reversed signal;
   extracting the time forward feature from said input signal; and
   extracting the time reversed feature from said time reversed signal.

3. The method according to claim 2, wherein said time-reversing comprises:
   dividing said input signal into partial signals of a predetermined reversed region length;
   time-reversing said partial signals, respectively; and
   synthesizing said time-reversed partial signals to generate the time reversed signal.

4. The method according to claim 3, wherein said reversed region length is 40 msec to 60 msec.

5. The method according to claim 1, wherein said input signal is a speech signal, a handwritten character signal, or a gesture signal.

6. The method according to claim 1, wherein said generating comprises:
   generating the time forward alignment which matches said time forward feature to each state on a time forward hidden Markov model by each frame; and
   generating the time reversed alignment which matches said time reversed feature to each state on a time reversed hidden Markov model by each frame.

7. The method according to claim 6, wherein said comparing comprises:
   computing a recognized-word likelihood between a recognized word corresponding to said time forward alignment and a recognized word corresponding to said time reversed alignment;
   computing an alignment likelihood between said time forward alignment and said time reversed alignment;
   computing a feature likelihood between features corresponding to said time forward alignment and features corresponding to said time reversed alignment; and
   combining said recognized-word likelihood, said alignment likelihood and said feature likelihood to compute a normalized whole likelihood between said forward alignment and said reversed alignment.

8. The method according to claim 7, wherein said combining comprises:
   multiplying each of said recognized-word likelihood, said alignment likelihood and said feature likelihood by a predetermined weight and adding them to obtain a weighted sum; and dividing said weighted sum by a total number of frames of the input signal to compute the normalized whole likelihood.

9. The method according to claim 6, wherein said comparing comprises:

comparing the state of each frame on said time forward alignment with the state of each frame on said time reversed alignment to search inserted, deleted or replaced states;

obtaining the number of identity frames by subtracting the number of the frames corresponding to said inserted, deleted or replaced states from the number of the whole frames; and determining the ratio obtained by dividing the number of said identity frames by the number of said whole frames as the likelihood.

10. An apparatus for determining a possibility of pattern recognition of a time series signal, comprising:

a feature extracting unit extracting a time forward feature and a time reversed feature from an input signal having a time series pattern;

an alignment generating unit generating time forward alignment and time reversed alignment by using said time forward feature and said time reversed feature;

a likelihood computing unit comparing said time forward alignment with said time reversed alignment to compute a likelihood; and a recognition possibility determining unit determining that said input signal can be recognized when said likelihood is larger than a predetermined threshold value, wherein the apparatus determines the possibility of pattern recognition independently of a pattern recognition ratio of each of pattern recognition models for recognizing patterns of the time series signal.

11. The apparatus according to claim 10, wherein said feature extracting unit comprises:

a signal reversing unit time-reversing said input signal to generate a time reversed signal;

a forward feature extracting unit extracting the time forward feature from said input signal; and a reversed feature extracting unit extracting the time reversed feature from said time reversed signal.

12. The apparatus according to claim 11, wherein said signal reversing unit comprises:

a signal dividing unit dividing said input signal into partial signals of a predetermined reversed region length;

a partial signal reversing unit time-reversing said partial signals, respectively; and a partial signal synthesizing unit synthesizing said time-reversed partial signals to generate the time reversed signal.

13. The apparatus according to claim 12, wherein said reversed region length is 40 msec to 60 msec.

14. The apparatus according to claim 10, wherein said input signal is a speech signal, a handwritten character signal, or a gesture signal.

15. The apparatus according to claim 10, wherein said alignment generating unit comprises:

a forward alignment generating unit generating the time forward alignment which matches said time forward feature to each state on a time forward hidden Markov model by each frame; and a reversed alignment generating unit generating the time reversed alignment which matches said time reversed feature to each state on a time reversed hidden Markov model by each frame.

16. The apparatus according to claim 15, wherein said likelihood computing unit comprises:

a recognized-word likelihood computing unit computing a recognized-word likelihood between the recognized word corresponding to said time forward alignment and a recognized word corresponding to said time reversed alignment;

an alignment likelihood computing unit computing an alignment likelihood between said time forward alignment and said time reversed alignment;

a feature likelihood computing unit computing a feature likelihood between features corresponding to said time forward alignment and features corresponding to said time reversed alignment; and a likelihood combining unit combining said recognized-word likelihood, said alignment likelihood and said feature likelihood to compute a whole likelihood between said forward alignment and said reversed alignment.

17. The apparatus according to claim 15, wherein said likelihood computing unit comprises:

a non-identity state searching unit comparing the state of each frame on said time forward alignment with the state of each frame on said time reversed alignment to search inserted, deleted or replaced states;

an identity frame number computing unit obtaining the number of identity frames by subtracting the number of the frames corresponding to said inserted, deleted or replaced states from the number of the whole frames; and a ratio computing unit determining the ratio obtained by dividing the number of said identity frames by the number of said whole frames as the likelihood.

18. A computer-readable storage medium encoded with processing instructions for causing a processor to execute a method of determining a possibility of pattern recognition of a time series signal, the method comprising:

extracting a time forward feature and a time reversed feature from an input signal having a time series pattern;

generating time forward alignment and time reversed alignment by using said time forward feature and said time reversed feature;

comparing said time forward alignment with said time reversed alignment to compute a likelihood of pattern recognition; and determining that said input signal can be recognized when said likelihood is larger than a predetermined threshold value, wherein the method of determining the possibility of pattern recognition is performed independent of a pattern recognition ratio of each of pattern recognition models for recognizing patterns of the time series signal.

* * * * *